(12) United States Patent
Adachi (10) Patent No.: US 6,481,522 B1
(45) Date of Patent: Nov. 19, 2002

(54) FRAME STRUCTURE FOR MOTORCYCLE

(75) Inventor: Eiji Adachi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/605,886

(22) Filed: Jun. 29, 2000

(30) Foreign Application Priority Data

Jun. 29, 1999 (JP) .......................................... 11-184381

(51) Int. Cl.⁷ .............................................. B62K 11/02
(52) U.S. Cl. ..................... 180/219; 280/274; 280/281.1
(58) Field of Search ................. 280/274, 279, 280/280, 281.1, 288.2, 288.3; 180/219

(56) References Cited

U.S. PATENT DOCUMENTS

| | | | |
|---|---|---|---|
| 704,288 A | * | 7/1902 | Anderson |
| 2,043,759 A | * | 6/1936 | Lewis |
| 4,561,670 A | * | 12/1985 | Takada ................. 280/281.1 |
| 4,585,247 A | * | 4/1986 | Takada ................. 280/281.1 |
| 4,699,233 A | * | 10/1987 | Koga et al. ................. 280/274 |
| 5,353,888 A | * | 10/1994 | Tsukahara ................. 180/219 |
| 5,876,054 A | * | 3/1999 | Olson et al. ............. 280/281.1 |

FOREIGN PATENT DOCUMENTS

JP        A6107261        4/1994

* cited by examiner

*Primary Examiner*—Anne Marie Boehler
(74) *Attorney, Agent, or Firm*—Birch, Stewart, Kolasch & Birch, LLP (57) ABSTRACT

To provide a motorcycle frame structure having a head pipe manufactured by forging that enables a significant reduction in forging costs and enables a reduction in welding costs for a front frame and a down tube. A down tube is welded to an upper tongue, a lower surface of a lower flange section and a lower tongue. A weld bead is provided and it is possible to ensure a sufficiently long weld length with regard to the weld bead. Since only the upper and lower tongues are integrally formed with the forged component, there is no need to include an undercut processing in the forging process. Accordingly, it is possible to reduce the manufacturing cost.

18 Claims, 10 Drawing Sheets

FRAME STRUCTURE FOR MOTORCYCLE

BACKGROUND OF THE INVENTION

1. Field of the Invention

The present invention relates to an improved motorcycle frame.

2. Description of Background Art

In a motorcycle, a structure is adopted where front forks and a steering handlebar are attached to a head pipe via a handle rotating shaft, and a front wheel is attached to the front forks so that the motorcycle can be steered, with the head pipe functioning as a central pivot point. Because a front frame extends rearwardly from the head pipe, or a down tube extends diagonally rearwardly from the head pipe, a frame structure where the end of the front frame and the down tube are formed integrally with the head pipe is generally adopted.

For example, FIG. 2 of Japanese Patent Laid-open No. Hei. 6-107261, entitled Motorcycle Frame Structure, shows a head pipe 5 and a front frame 4, while a head pipe section 5A and a frame section 14A' are shown in FIG. 4.

The head pipe section 5A shown in FIG. 4 of the above mentioned publication is described as a "forged component" with a frame section 14A' integrally welded to the forged component as discussed in paragraph 0018, lines 4 to 6 of Japanese Patent Laid-open Hei. 6-107261.

However, it is difficult to make the forged component strong compared to a rolled member or an extruded member, and it must be made thick in order to compensate for this. If the forged member is made thick, the weight of the frame is also increased. Also, since the head pipe section 5A is a forged component and welding is more complicated for a forged component compared to a rolled member or an extruded member, the number of welding steps is increased. Accordingly, if the forged head pipe is adopted there is a resulting increase in weight and manufacturing cost.

Also, as described in paragraph 0011, line 7 of the above described publication, the head pipe 5 and front frame 4 of FIG. 2 mentioned above are integrally formed by casting or forging. However, as shown in FIG. 3 of the same publication, a rear edge 17A of the front frame 4 has a cross section in the shape of a three-sided square, and is what is known as undercut, and is difficult to forge, which means that forging becomes 2-stage (the undercut section is formed in a later stage) or multiple stage forging having three or more stages, and forging cost is increased, making actual production unfeasible.

When the head pipe and the front frame are integrally formed by casting, their strength is reduced compared to a head pipe and a front frame made of a rolled member or extruded member, and it must be made very thick to compensate for this. Increased thickness makes the frame heavier.

There are problems associated with cast and forged parts of the related technology, but generally speaking it can be said that forged parts are much stronger than cast parts.

SUMMARY AND OBJECTS OF THE INVENTION

An object of the present invention is therefore to provide a motorcycle frame structure, adopting a head pipe manufactured by forging, that enables significant reduction in forging costs, and enables reduction in welding costs when welding hollow frames such as a front frame and down tube etc.

In order to achieve the above described objects, the present invention is directed to a motorcycle frame structure, the motorcycle frame joining together a head pipe and hollow frame extending backwards from the head pipe by welding, the head pipe being made into a pipe by opening a longitudinal hole in a forged component forged using left and right dies, and an upper tongue and a lower tongue gripping a tip of the hollow frame being integrally formed at the time of forging.

An upper tongue and a lower tongue gripping a tip of a hollow frame are integrally formed in the forged component, and the hollow frame is inserted between the upper and lower tongues and welded.

Since only the upper and lower tongues are integrally formed with the forged component, there is no need to include undercut processing in the forging process. Accordingly, it is possible to reduce the manufacturing cost.

In addition, because the hollow frame is inserted between the upper and lower tongues, positioning of the tip of the hollow frame is straightforward, initial set-up before welding is simplified, and holding the hollow frame is easy, which means that the welding operation is simplified. If the hollow frame is welded to the upper and lower tongues, it is possible to ensure sufficient weld length. Accordingly, it is possible to reduce the welding costs.

The present invention is directed to a motorcycle frame structure, the motorcycle frame joining together a head pipe and hollow frame extending backwards from the head pipe by welding, the head pipe being made into a pipe by opening a longitudinal hole in a forged component forged using left and right dies, and a flange insertion seat, comprising a vertical wall shaped web section extending backwards along a center line of the vehicle, upper and lower flange sections extending to the left and right from the web section, and a longitudinal frame section, being integrally formed at the time of forging for insertion of left and right hollow frames.

At the time of forging, a wall-like web section, upper and lower flange sections extending laterally from this web section and a vertical flange section are also integrally formed by left and right divided molds. The web section can be formed between left and right molds, while the upper and lower flange sections and the vertical flange section can be formed swelling out by forging, which means that the flow of metal at the time of forging becomes smooth and it is possible to obtain a high strength forged component.

A frame insertion seat is formed in the forged component, and the hollow frame is inserted into the frame insertion seat and welded.

Since the frame insertion seat is only integrally formed with the forged component, there is no need to include an undercut in the forging molds. This makes it possible to reduce the forging cost.

In addition, because the hollow frame is inserted into the frame insertion seat, set-up before welding is simplified. If the hollow frame is welded into the frame insertion seat, it is possible to ensure a sufficient weld length, which makes it possible to reduce the welding costs.

The present invention is directed to the head pipe having small left and right windows formed by a punching process in the forged component together with the longitudinal hole, and ends of the left and right hollow frames can be inserted into these small windows prior to welding.

Small windows into which the hollow frame will be inserted are formed together by punching.

Since there is no need for special operations to punch the small windows, it is possible to reduce the cutting costs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will now be described based on the attached drawings. The drawings are viewed in the direction of the symbols.

Figure 1:
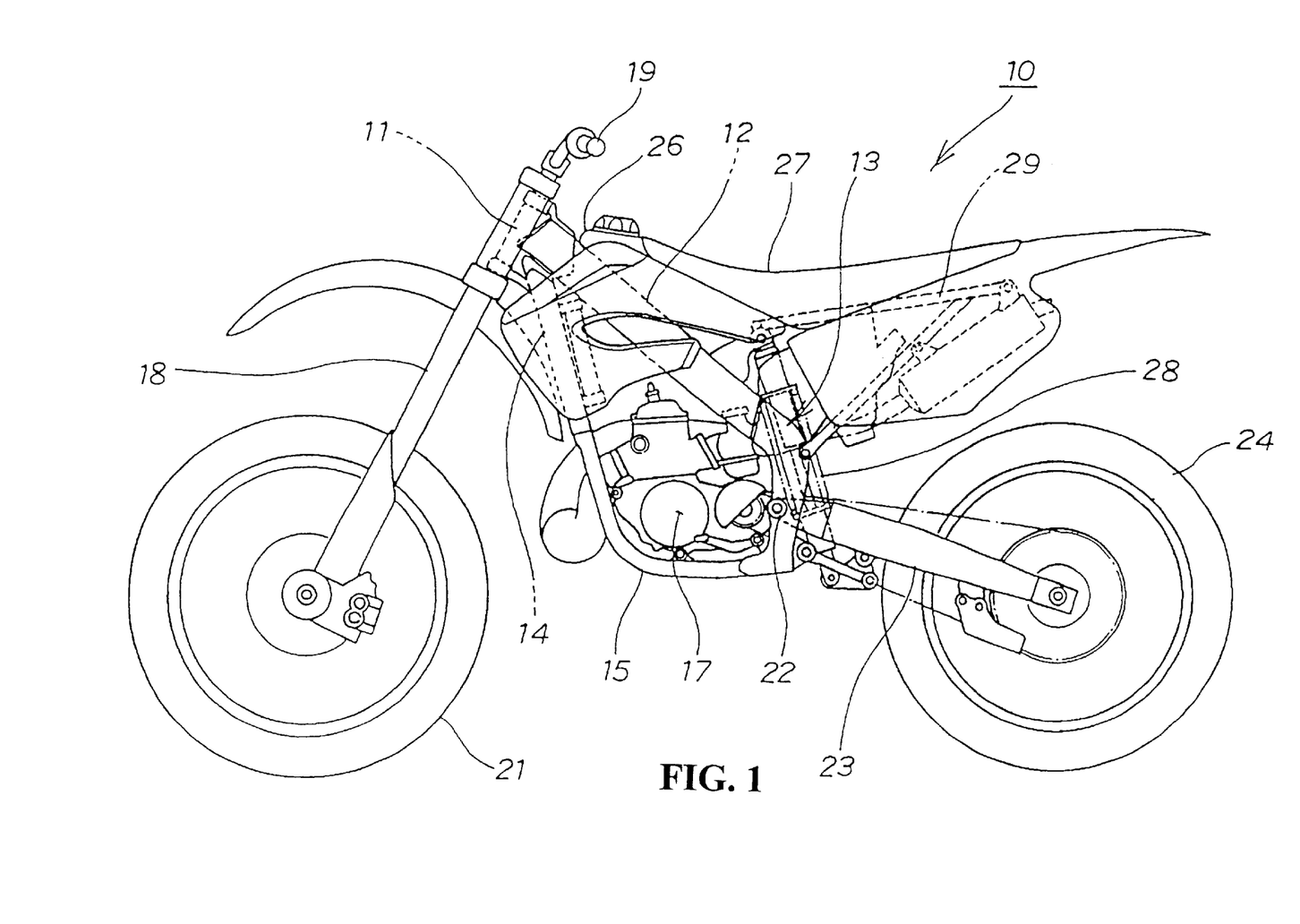
FIG. 1 is a side elevation of a motorcycle adopting the frame structure of the present invention.

FIG. 1 is a side elevation of a motorcycle adopting the frame structure of the present invention. A motorcycle 10 has a cradle frame (semi-cradle frame) type vehicle frame with a hollow main frame 12 extending rearwardly from a head pipe 11. A pivot frame 13 is linked to the main frame 12. A hollow down tube 14 extends rearwardly and downwardly from the head pipe 11 and causes the pivot frame 13 to curve downwardly. A lower frame 15 is linked to the down tube 14. A rear end of the lower frame 15 is connected to the pivot frame 13. An engine 17 is contained in the vehicle frame. A front fork 18 and steering handlebar 17 are attached to the head pipe 11 for steering. A front wheel 21 is rotatably attached to the front fork 18. A swingarm 23 is attached to the pivot frame 13 via a pivot shaft 22 so as to be capable of swinging up and down. A rear wheel 24 is attached to the swingarm 23, and a fuel tank 26 and a seat 27 are arranged above the vehicle frame. A rear cushion 28 is secured to a seat rail 29.

In this embodiment, the head pipe 11 is an aluminum forged component conforming to JIS H 4141 while the main frame 12 and the down tube 14 are hollow aluminum alloy extruded members.

Welding of an aluminum alloy requires advanced welding technology compared to the welding of carbon steel. The joint structure is a deciding factor in ensuring sufficient weld strength. This point is a characteristic of the present invention which utilizes a shape that is satisfactory for both the welding and forging of a joint structure. The specific structure will be described in the following.

Figure 2:
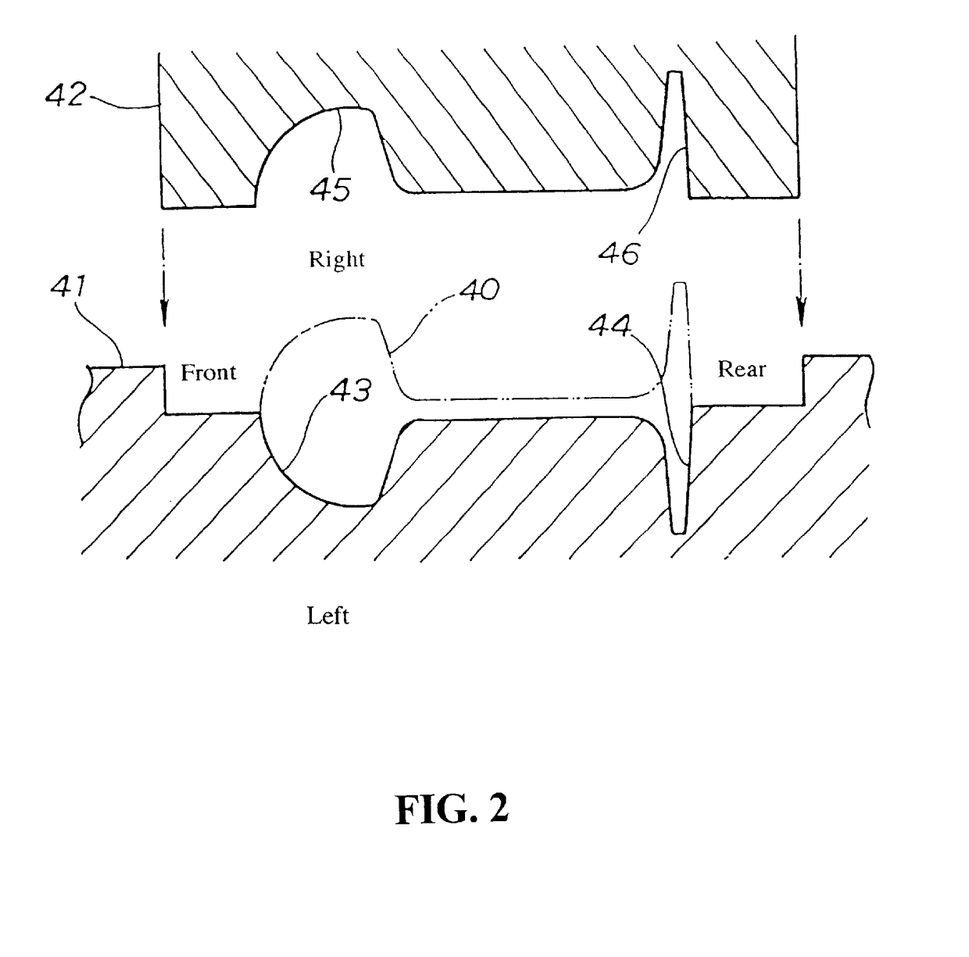
FIG. 2 is a view showing a die forging process for a head pipe of the present invention.

FIG. 2 is a view showing a die forging process for a head pipe of the present invention, with a forged component 40 shown by an imaginary line being the center, left and right in the drawing will be called "front" and "rear", and up and down in the drawings being called "right" and "left". Here, the forged component 40 is forged by left and right split dies, namely by bringing a punch 42 equivalent to a right mold down onto a fixed die 41 equivalent to a left mold. As will be clear from the drawing, the forged component does not contain an undercut, which means that the profiles of forging crevices 43, 44, 45 and 46 in the fixed die 41 and the punch 42 can be made simple and the cost of the fixed die 41 and the punch 42, namely the die costs, can be reduced.

FIG. 1 shows single stage forging, but there is no problem involved in having multiple stage forging of two or more stages in order to carry out the operation at a reduced pressure. In addition, an increase in cost can be avoided in this case as there is no undercut.

Figure 3:
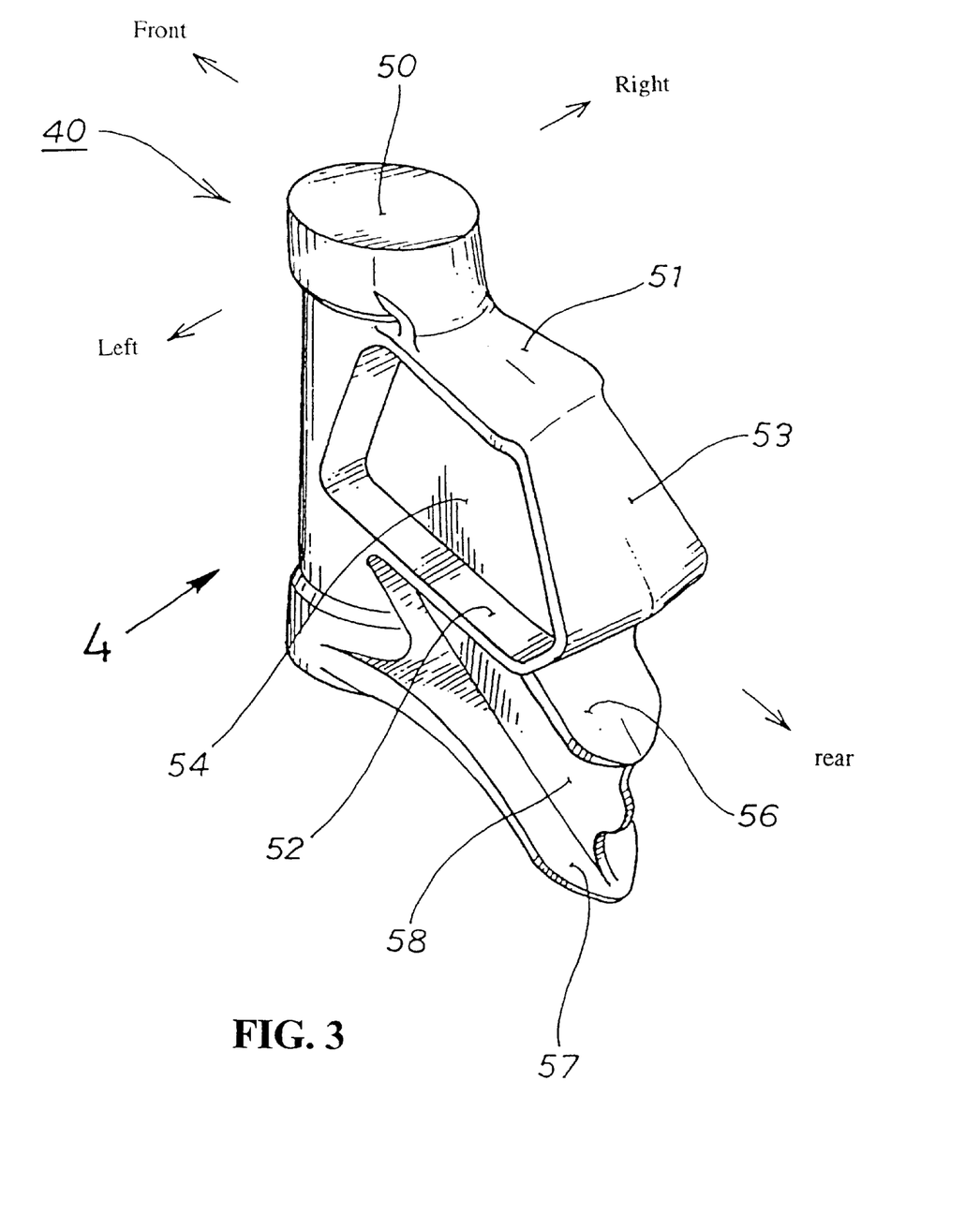
FIG. 3 is a perspective view of a forged component of the present invention.

FIG. 3 is a perspective view of a forged component of the present invention, the forged component 40 includes a cylindrical section 50, upper and lower flange sections 51 and 52 extending rearwardly from the cylindrical section 50 and a vertical flange section 53 joined to rear sections of the upper and lower flange sections 51 and 52. A wall-like web section 54 is provided for dividing a space defined by the flange sections 51, 52 and 53 into left and right halves. An upper tongue 56 and a lower tongue 57 extend diagonally downwardly and rearwardly from the side of the cylindrical section 50 side below the lower flange section 52. A film 58 is left behind between the upper and lower tongues 56 and 57.

In the case of the forging shown in FIG. 1, the wall-like web section 54, the upper and lower flange sections 51 and 52 extending laterally from this web section and the vertical flange section 53 are also integrally formed by left and right divided molds. The web section 54 can be formed between left and right molds, while the upper and lower flange sections 51 and 52 and the vertical flange section 53 can be formed by swelling out by forging. The flow of metal at the time of forging becomes smooth and a high strength forged component is obtained.

Figure 4:
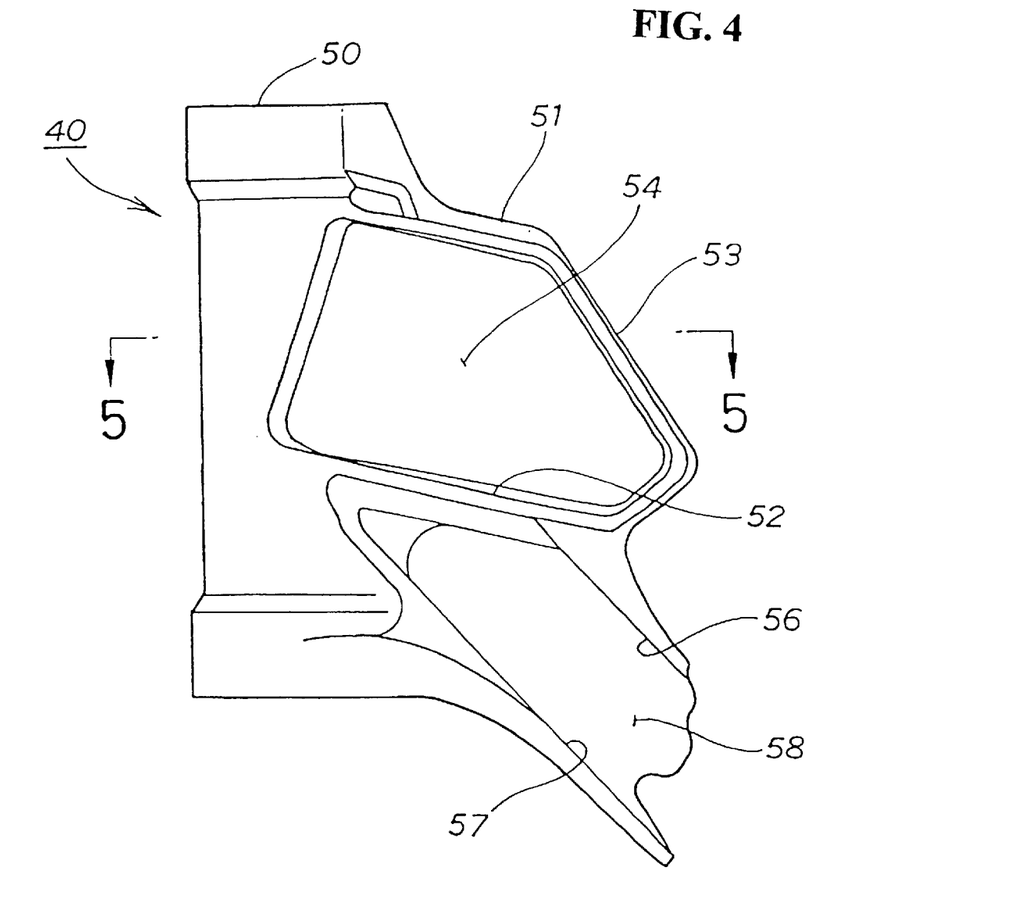
FIG. 4 is a view in the direction of arrow 4 in FIG. 3.

FIG. 4 is a view in the direction of arrow 4 in FIG. 3, and shows a positional relationship between the cylindrical section 50, the upper and lower flange sections 51 and 52, the vertical flange section 53, the web section 54, the upper tongue 56, the lower tongue 57 and the film 58.

Figure 5:
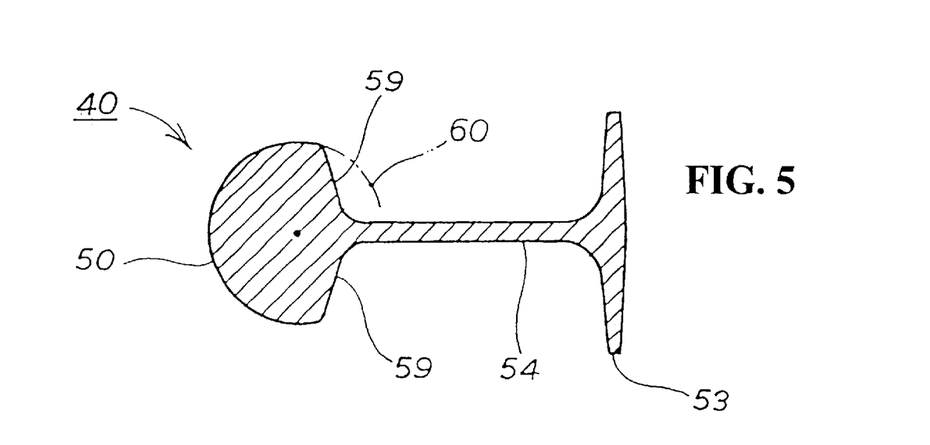
FIG. 5 is a cross sectional view along line 5—5 in FIG. 3.

FIG. 5 is a cross-sectional view along line 5—5 in FIG. 3 and shows a cross section connecting the cylindrical section 50, the web section 54 and the vertical flange section 53, but the cylindrical section 50 comprises sloping surfaces 59, 59 connecting to the web section 54, and is hollowed out to a large extent from a virtual circle 60 shown by the imaginary line towards the center of the cylindrical section. These sloping surfaces 59, 59 are hollowed out in order to make the small windows that will be described later.

Cutting and welding processes performed on the forged component described in FIG. 3–FIG. 5 will be described in order in the following.

Figure 6:
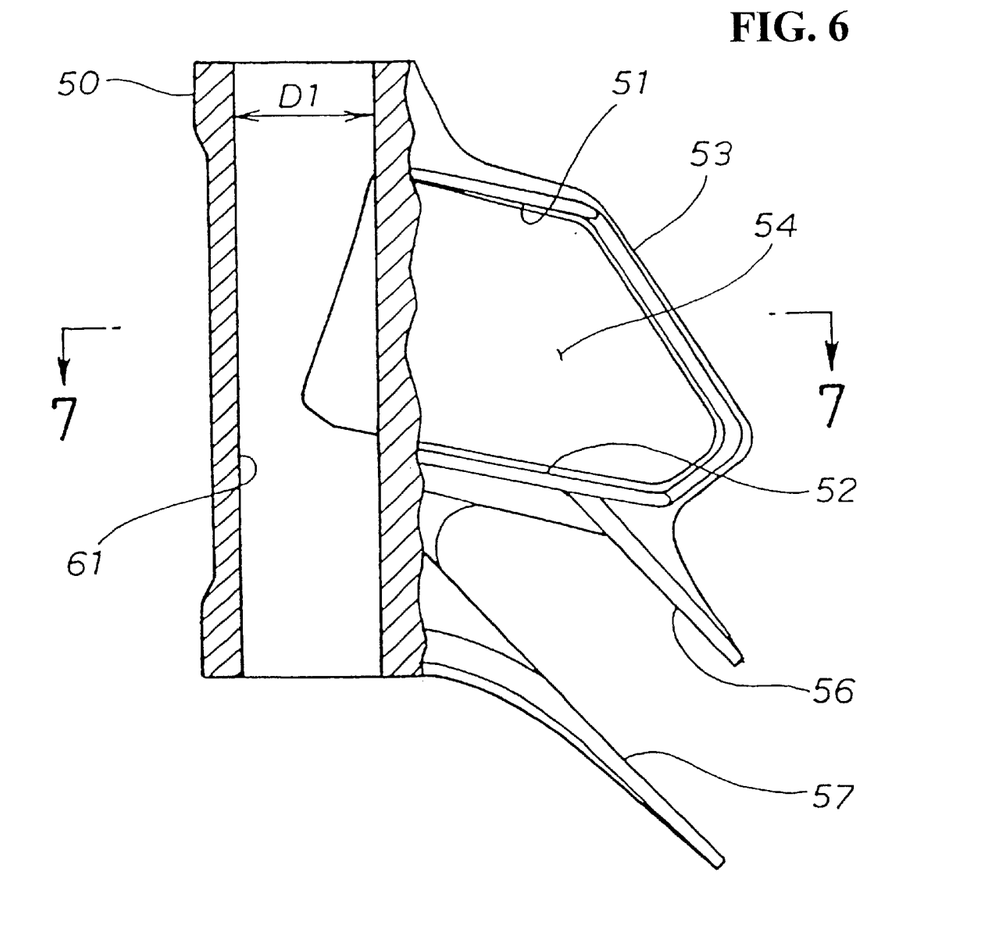
FIG. 6 is a drawing illustrating a first cutting job of the present invention.

FIG. 6 is a drawing illustrating a first cutting job of the present invention, and showing a penetration laterally (from front to back in the drawing) through and between the upper and lower tongues 56 and 57 by cutting away the film 58 in FIG. 4, and by cutting a longitudinal hole 61 having radius D1 in the cylindrical section 50.

Figure 7:
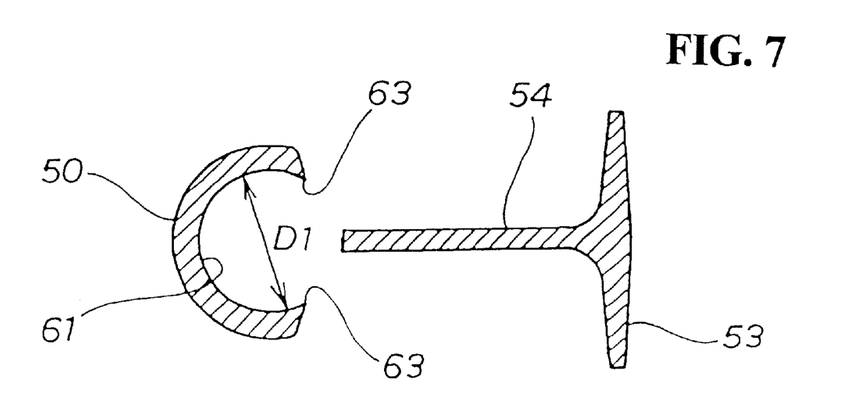
FIG. 7 is a cross sectional drawing along line 7—7 in FIG. 6.

FIG. 7 is a cross-sectional drawing along line 7—7 in FIG. 6, illustrating the locations of the sloping surfaces 59, 59 cut out by cutting the longitudinal hole of radius D1, and the resultant forming of the small windows 63 and 63 shown in FIG. 7.

Figure 8:
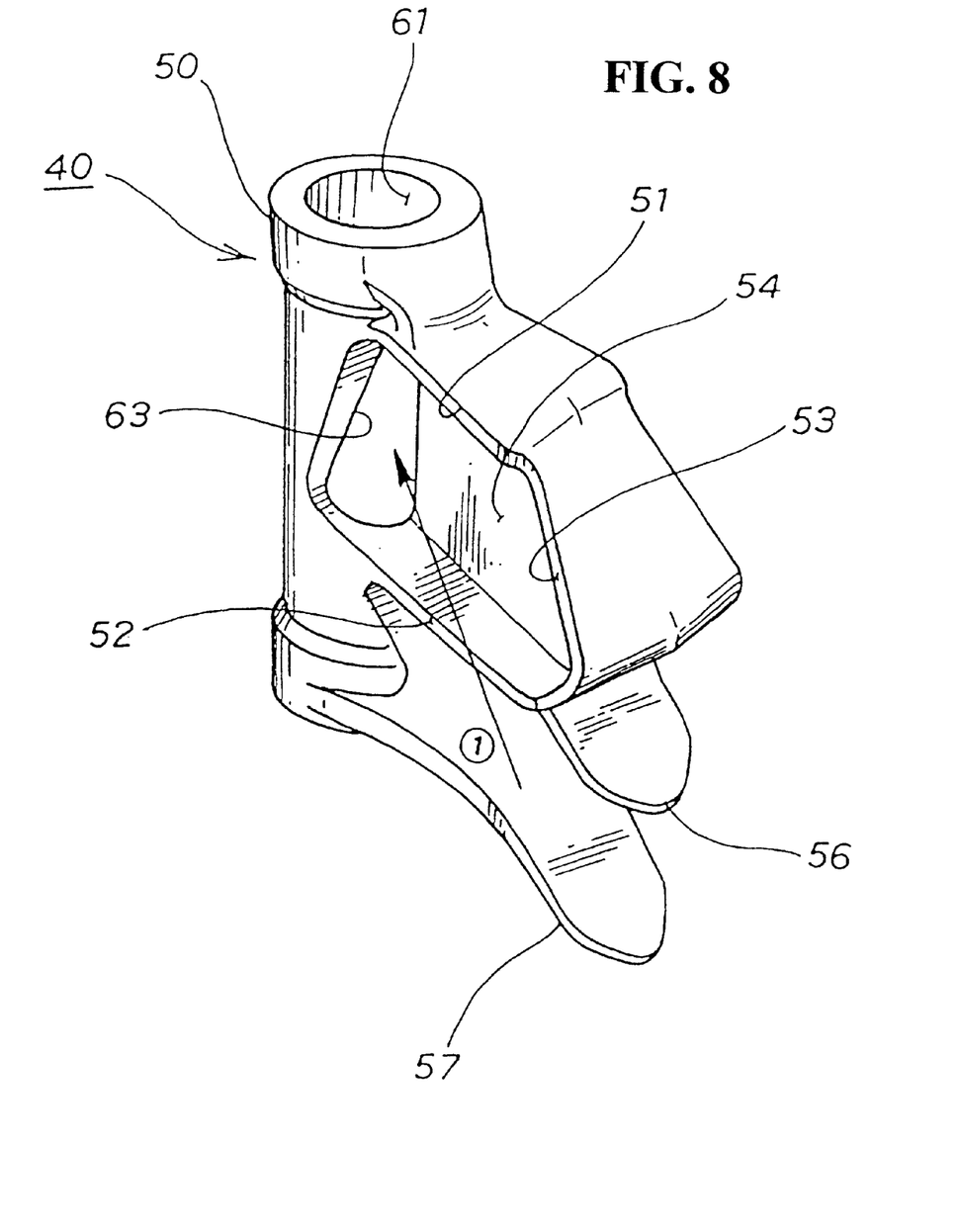
FIG. 8 is a perspective view of the first cut component of the present invention.

FIG. 8 is a perspective view of the first cut component of the present invention illustrating the small windows 63, 63 in the cylindrical section 50 of the forged component 40. The small windows 63 are enclosed by the upper and lower flanges 51 and 52 and the vertical flange 53, and when viewed in the direction of the arrow illustrated by the number 1 set forth in a circle, it will be understood that the vertical flange section 53 constitutes a hurdle (a wall or a bank), the upper and lower flange sections 51 and 52 constitute guide walls for regulating upper and lower parts of the main frame 12, and the small windows 63 constitute inner openings.

Figure 9:
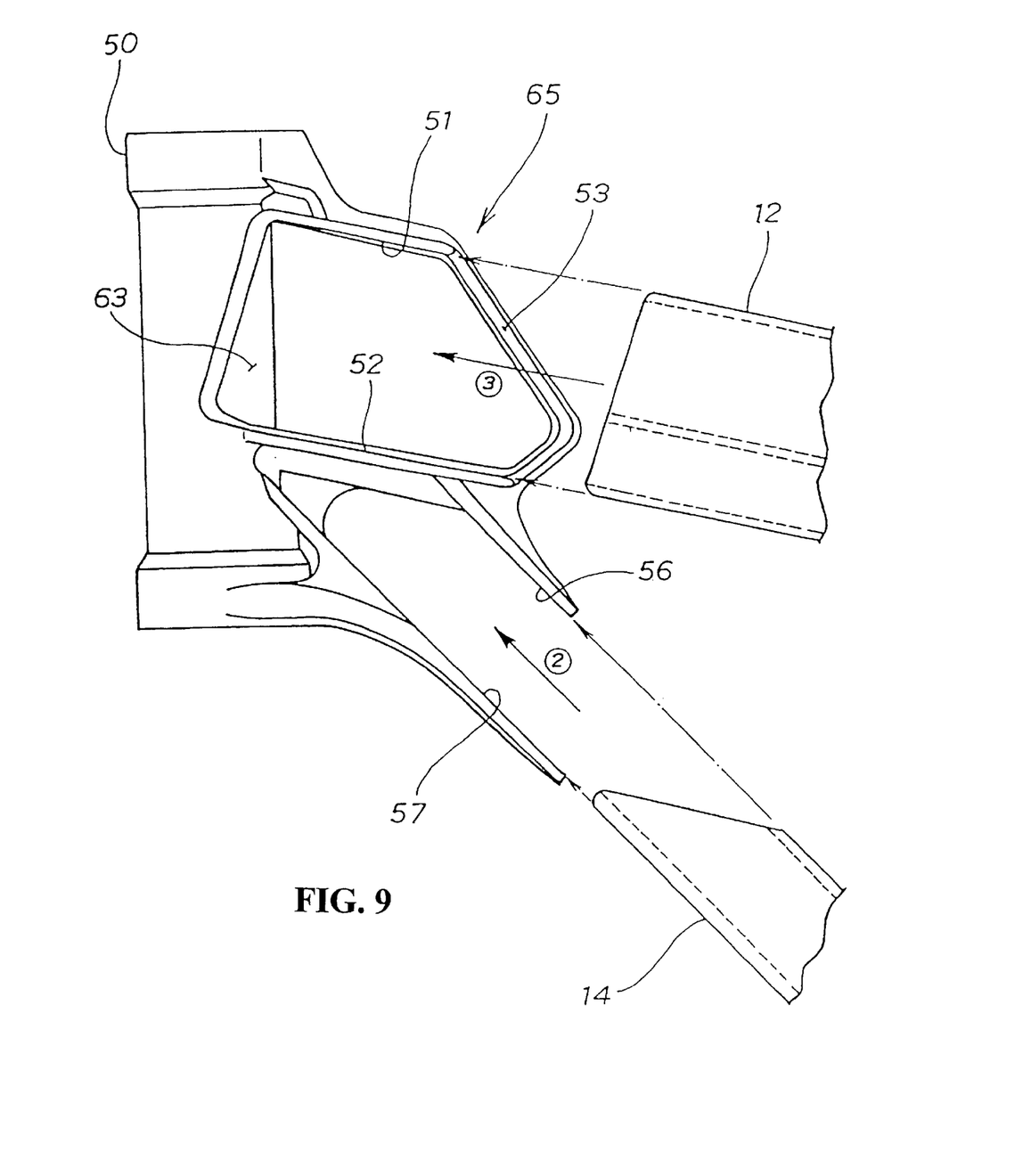
FIG. 9 is a procedural drawing of when hollow frames are put into the first cut component of the present invention.

FIG. 9 is a procedural drawing of when hollow frames are put into the first cut component of the present invention. Main frames 12 (two items) being hollow frames and a down tube 14 also being a hollow frame are prepared, and the down tube 14 is inserted between the upper and lower tongues 56 and 57 in the direction of the arrow illustrated by the number 2 set forth in a circle. The main frame 12 is then inserted in the direction of the arrow illustrated by the number 3 set forth in a circle while slipping along the vertical flange section 53 and the upper and lower flange sections 51 and 52. Here, it will be understood that the web section 54, the vertical flange section 53 and the upper and lower flange sections 51 and 52 are structural elements of the frame insertion seat 65 for insertion of the main frame 12. The end of the main frame 12 inserted along the frame insertion seat 65 is also inserted into the small window 63.

Figure 10:
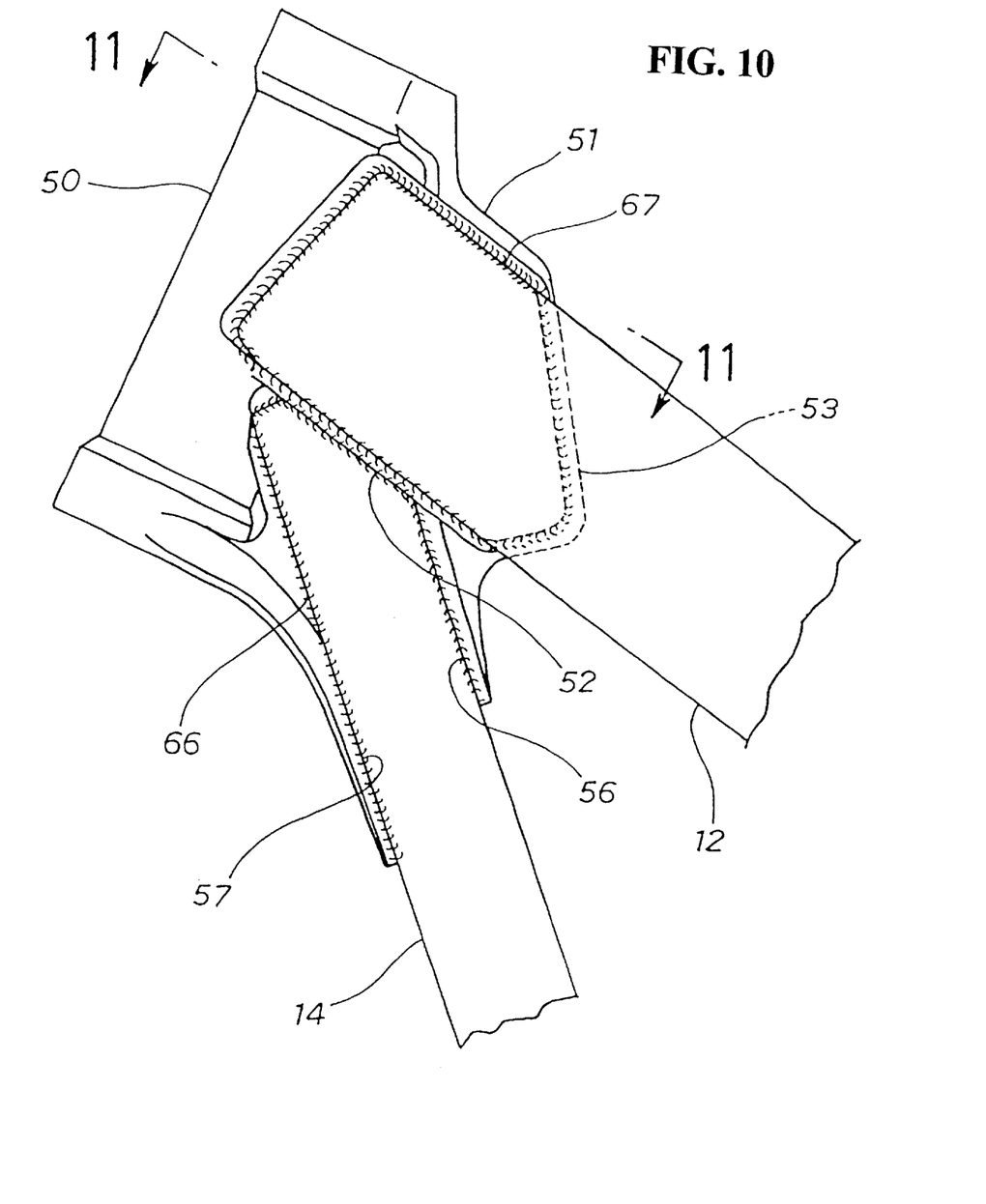
FIG. 10 is a procedural drawing of when the hollow frames are welded to the first cut component of the present invention.

FIG. 10 is a procedural drawing of when the hollow frames are welded to the first cut component of the present invention, and shows the down tube 14 welded to the upper tongue 56, a lower surface of the lower flange section 52 and the lower tongue 57. Reference numeral 66 represents a weld bead and it is possible to ensure a sufficiently long weld length.

Also, the main frame 12 is welded to the upper flange section 51, the cylindrical section 50, the lower flange section 52 and the vertical flange section 53. A weld bead 67 is provided and it is possible to ensure a sufficiently long weld length.

Figure 11:
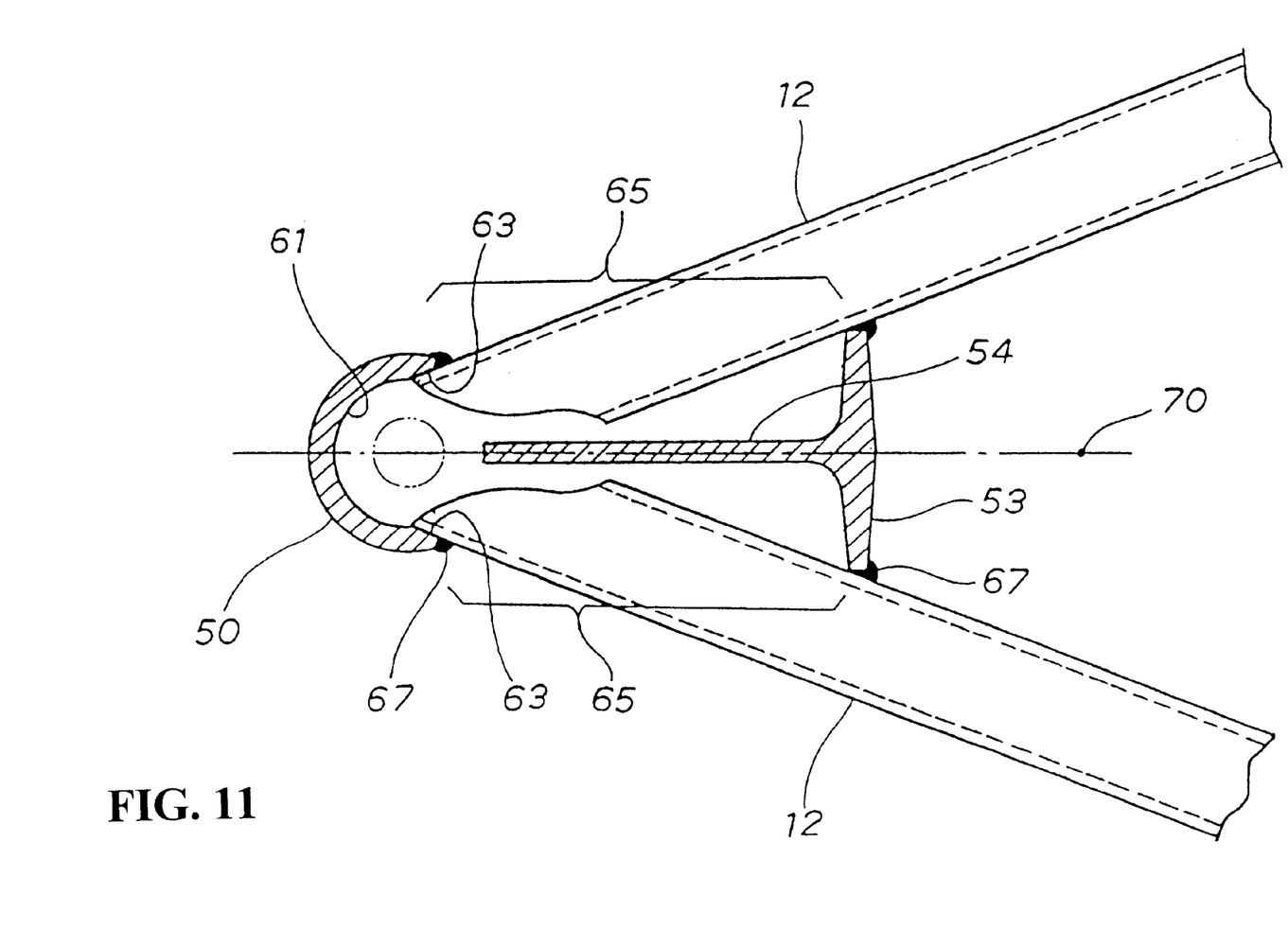
FIG. 11 is a cross sectional drawing along line 11—11 in FIG. 10.

FIG. 11 is a cross-sectional drawing along line 11—11 in FIG. 10, and shows that the mainframes 12, 12 are welded to the cylindrical section 50 with the ends of the mainframes 12, 12 inserted in the small windows 63, 63. A center line 70 of the vehicle is illustrated in FIG. 11.

Specifically, the drawing shows the state when frame insertion seats 65, 65 are symmetrical about the center line 70 of the vehicle and are integrally formed at the time of forging for insertion of the left and right main frames 12. The main frames 12, 12 are joined to the cylindrical section 50 (equivalent to the head pipe because the vertical hole 61 is formed) by inserting and welding the main frames 12, 12 into these frame seats 65.

Figure 12:
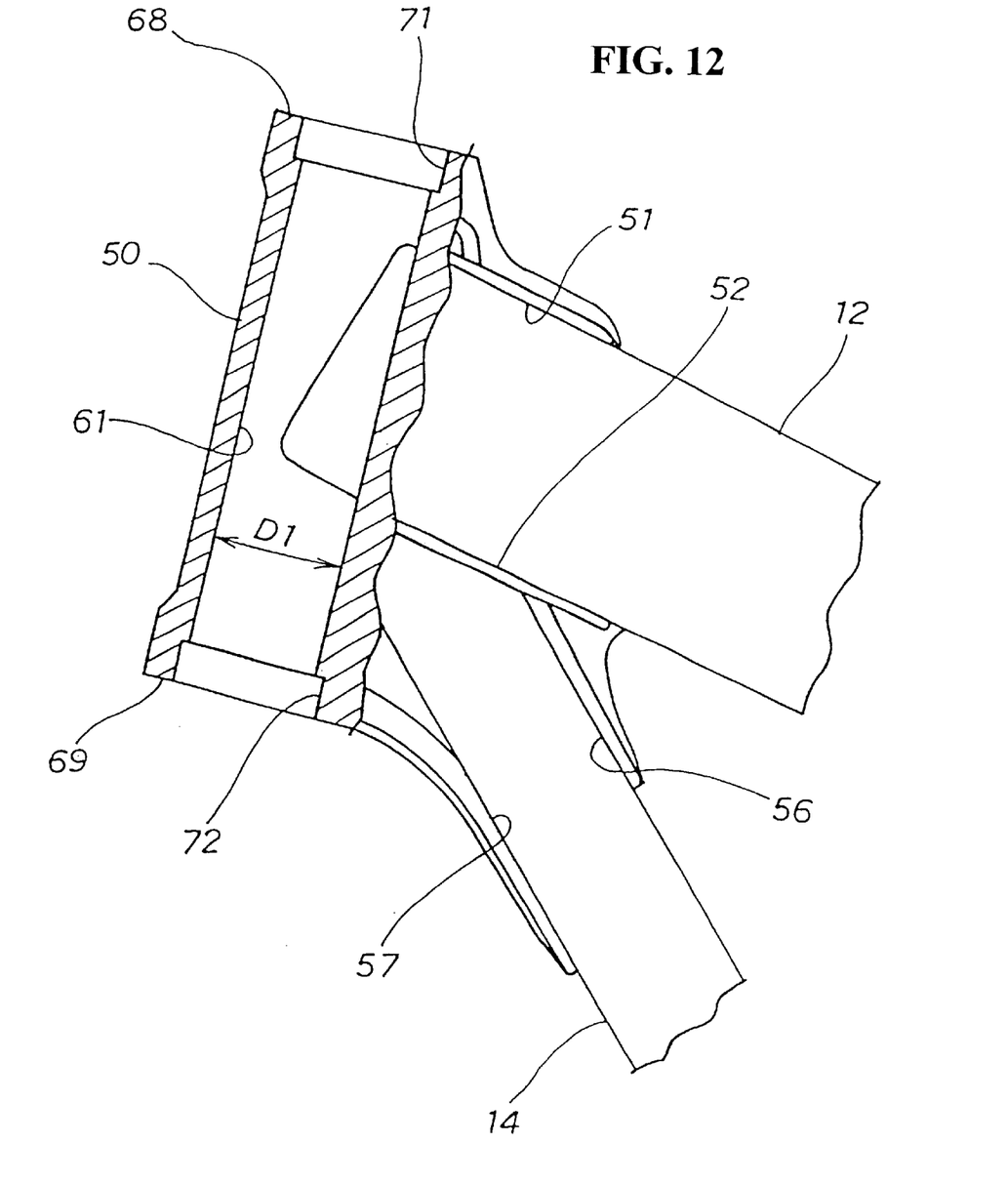
FIG. 12 is a procedural view for a second cutting job of the present invention.

FIG. 12 is a view illustrating the results of a second cutting job of the present invention. With the second cutting job, an upper surface 68 and a lower surface 69 of the cylindrical section are machine finished so as to be parallel to each other. Thereafter, bearing seats 71 and 72 for containing bearings are cut into upper and lower sections of the cylindrical section 50.

There is no problem in carrying the finishing of the upper and lower surfaces 68 and 69 of the cylindrical section and cutting of the bearing seats at the same time as the cutting process of FIG. 6. In this way, the second cutting process can be done away with and it is possible to shorten the time required for manufacture.

Contrary to this, if the second cutting process is executed after welding, as in this embodiment, then even if warping or deformation arise as a result of the welding, it is possible for the cutting process to absorb the warping and deformation and it is easy to improve finishing precision.

Accordingly, whether or not the second cutting process is carried out can be determined taking into consideration the finishing precision required for the product, etc.

Also, in this embodiment the hollow frame of the present invention has been described as a down tube, but the hollow frames inserted between the upper and lower tongues are not limited to a down tube and can be a main frame or other frame.

In this embodiment, the hollow frame of the present invention has been described as a main frame, but the hollow frame inserted into the frame insertion seat is not limited to a main frame and can be a down tube or other frame.

The present invention achieves the following effect. With the present invention, since only the upper and lower tongues are integrally formed with the forged component, there is no need to include an undercutting process in the forging process. Accordingly, it is possible to reduce the manufacturing cost.

In addition, because the hollow frame is inserted between the upper and lower tongues, the positioning of the tip of the hollow frame is straightforward, initial set-up before welding is simplified, and holding the hollow frame is easy, which means that the welding operation is simplified. If the hollow frame is welded to the upper and lower tongues, it is possible to ensure sufficient weld length. Accordingly, it is possible to reduce the welding costs.

With the present invention, a characteristic feature is that a wall-like web section, upper and lower flange sections extending laterally from this web section and a vertical flange section are also integrally formed by left and right divided molds at the time of forging, and the web section can be formed between left and right molds, while the upper and lower flange sections and the vertical flange section can be formed to be swelling out by forging, the flow of metal at the time of forging becomes smooth and it is possible to obtain a high strength forged component. Specifically, since the frame insertion seat is only integrally formed with the forged component, there is no need to include an undercut in the forging molds. This makes it possible to reduce the forging cost.

In addition, because the hollow frame is inserted into the frame insertion seat, set-up before welding is simplified. If the hollow frame is welded into the frame insertion seat, it is possible to ensure a sufficient weld length, which makes it possible to reduce the welding costs.

With the present invention, since small windows into which the hollow frame will be inserted are formed together by punching, there is no need for special operations to punch the small windows, and it is therefore possible to reduce the cutting costs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle frame structure comprising:
   a unitary forged head pipe formed by forging by using left and right dies, said head pipe including a center line in a longitudinal direction;
   a frame including a tip end and a distal end;
   an opening extending through and being formed in the longitudinal direction in said head pipe; and
   an upper tongue and a lower tongue for engaging the tip end of the frame, said upper tongue and lower tongue each having an extending portion extending in a direction from the center line of the headpipe to the outside, said upper tongue and said lower tongue being integrally formed as part of said head pipe at the time of forging, and said tip end of said frame being secured to said upper tongue and said lower tongue of said head pipe by welding, said extending portions not including bent portions.

2. The motorcycle frame structure according to claim 1, wherein said upper tongue and said lower tongue extend a predetermined distance from said head pipe for enabling said tip end of said frame to be secured relative thereto for welding said tip end of said frame said upper tongue and said lower tongue.

3. The motorcycle frame structure according to claim 2, wherein said upper tongue and said lower tongue are spaced a predetermined distance relative to each other to permit said tip end of said frame to be inserted therebetween.

4. The motorcycle frame structure according to claim 2, wherein said upper tongue extends a first predetermined distance relative to said head pipe and said lower tongue extends a second predetermined distance relative to said head pipe, said second predetermined distance being longer relative to said first predetermined distance.

5. A motorcycle frame structure comprising:
   a unitary forged head pipe formed by forging by using left and right dies, said head pipe including a longitudinal direction and a center line;
   an opening extending through and being formed in the longitudinal direction in said head pipe;
   a flange insertion seat including a vertical wall shaped web section, upper flange section, lower flange section, and vertical flange section that extend from the web section and are integrally formed at the time of forging for insertion of left and right hollow frames, wherein the upper flange section, the lower flange section, and the vertical wall do not include bent portions.

6. The motorcycle frame structure according to claim 5, wherein the head pipe includes left and right windows formed by a punching process in the forged component together with the longitudinal hole, and ends of the left and right hollow frames can be inserted into the windows prior to welding.

7. The motorcycle frame structure according to claim 5, and further including an upper tongue and a lower tongue extending in a predetermined distance from said head pipe for enabling a tip end of a hollow down pipe to be secured relative thereto for welding said tip end of said hollow down tube to said upper tongue and said lower tongue.

8. The motorcycle frame structure according to claim 7, wherein said upper tongue and said lower tongue are spaced a predetermined distance relative to each other to permit said tip end of said hollow down tube to be inserted therebetween.

9. The motorcycle frame structure according to claim 7, wherein said upper tongue extends a first predetermined distance relative to said head pipe and said lower tongue extends a second predetermined distance relative to said head pipe, said second predetermined distance being longer relative to said first predetermined distance.

10. The motorcycle frame structure according to claim 5, wherein a left side and a right side of the vertical wall section are notched-shaped.

11. A method of forming a motorcycle frame structure comprising the following steps:
    unitarily forging a head pipe by using left and right dies, said head pipe including a center line in a longitudinal direction;
    providing a frame including a tip end and a distal end;
    forming an opening extending through and being formed in the longitudinal direction in said head pipe; and
    forming an upper tongue and a lower tongue for engaging the tip end of the frame, said upper tongue and lower tongue each having an extending portion extending in a direction from the center line of the headpipe to the outside, said extending portions not including bent portions, said upper tongue and said lower tongue being integrally formed as part of said head pipe at the time of forging, and said tip end of said frame being secured to said upper tongue and said lower tongue of said head pipe by welding.

12. The method of forming a motorcycle frame structure according to claim 11, wherein said upper tongue and said lower tongue extend a predetermined distance from said head pipe for enabling said tip end of said frame to be secured relative thereto for welding said tip end of said frame to said upper tongue and said lower tongue.

13. The method of forming a motorcycle frame structure according to claim 12, wherein said upper tongue and said lower tongue are spaced a predetermined distance relative to each other to permit said tip end of said frame to be inserted therebetween.

14. The method of forming a motorcycle frame structure according to claim 12, wherein said upper tongue extends a first predetermined distance relative to said head pipe and said lower tongue extends a second predetermined distance relative to said head pipe, said second predetermined distance being longer relative to said first predetermined distance.

15. A motorcycle frame structure comprising:
    a head pipe formed by forging by using left and right dies, said head pipe including a longitudinal direction and a center line;
    an opening extending through and being formed in the longitudinal direction in said head pipe;
    a flange insertion seat including a vertical wall shaped web section, upper flange section, lower flange section, and vertical flange section that extend from the web section and are integrally formed at the time of forging for insertion of left and right hollow frames; and
    left and right windows formed in said head pipe by a punching process in the forged component together with the longitudinal hole, and a tip end of the left and right hollow frames can be inserted into the left and right windows prior to welding.

16. The motorcycle frame structure according to claim 15, and further including an upper tongue and a lower tongue extending a predetermined distance from said head pipe for enabling a tip end of a hollow down tube to be secured relative thereto for welding said tip end of said hollow down frame to said upper tongue and said lower tongue.

17. The motorcycle frame structure according to claim 16, wherein said upper tongue and said lower tongue are spaced a predetermined distance relative to each other to permit said tip end of said hollow down tube to be inserted therebetween.

18. The motorcycle frame structure according to claim 16, wherein said upper tongue extends a first predetermined distance relative to said head pipe and said lower tongue extends a second predetermined distance relative to said head pipe, said second predetermined distance being longer relative to said first predetermined distance.

\* \* \* \* \*